Sept. 22, 1931.   R. BERGERIOUX   1,824,532
DISTRIBUTING DEVICE FOR FERTILIZER, GRAIN, AND SEED DRILLS
Original Filed Feb. 15, 1928
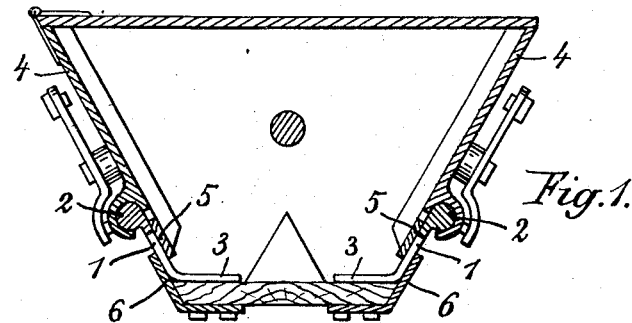
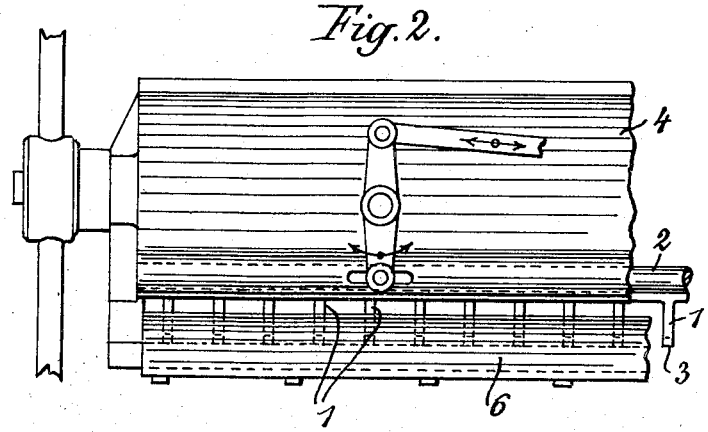
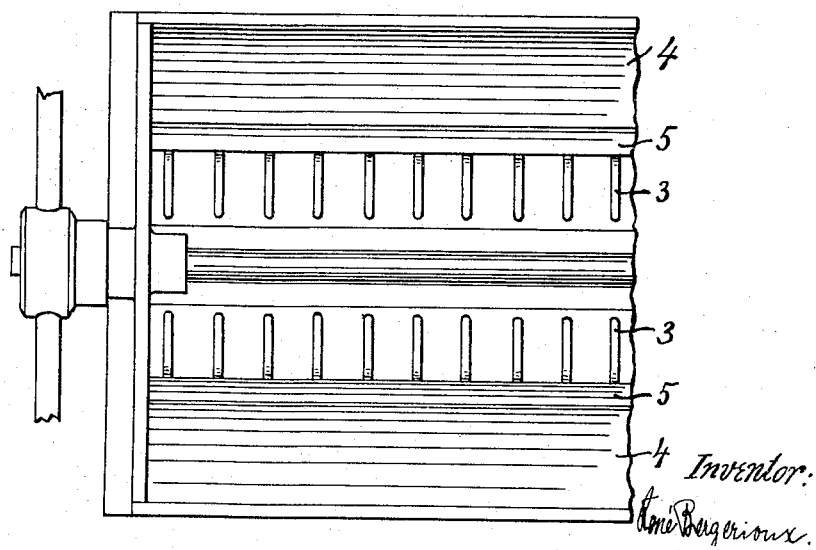

Patented Sept. 22, 1931

1,824,532

UNITED STATES PATENT OFFICE

RENÉ BERGERIOUX, OF REUILLY, FRANCE

DISTRIBUTING DEVICE FOR FERTILIZER, GRAIN AND SEED DRILLS

Original application filed February 15, 1928, Serial No. 254,559, and in France October 24, 1927. Divided and this application filed March 19, 1930. Serial No. 437,262.

This application is a division of application Ser. No. 254,559, filed Feb. 15, 1928.

This invention relates to a reciprocating distributing device for fertilizer, grain and seed drills, said device being designed to permit of sowing granulates without any risk of anomalous delivery through slipping of granulates chiefly occasionated by jolts and to do away with friction of the slide-blocks against the walls and the bottom of the box containing the material to be spread.

In order to make my invention more clearly understood I have illustrated an embodiment thereof in and by drawings appended hereto and wherein:—

Fig. 1 is a cross section of a drill fitted with the distributing device which is the object of my invention;

Fig. 2 is a side view; and

Fig. 3 a plane view of the same.

As shown by the drawings, the distributing fingers or other distributing members are constituted by a vertical or slanting part 1 integral with rods 2 and by a horizontal part 3 which penetrates on either side into the container through an adjustable distributing slot arranged between the bottom and the lower edge of a vertical wall or partition 4 provided with an adjusting blade 5. Rods 2, together with their fingers 1, 3, are reciprocated in a combined manner by suitable contrivances (not shown). The bottom of the container carries a flange 6 which runs up to or higher than the lower edge of wall or partition 4 so that the material to be sown is compelled to pass through the clearance between the fingers, that is to say to go up to a certain height previous to being spread. This arrangement permits of granulated or powdered material being sown without any risk of anomalous delivery through slipping out.

I claim:

In a seed and like distributing machine, the combination with a container having in its side wall a slot carried parallel to and close to the bottom, of a distributing element comprising a reciprocating rod mounted on the outer surface of the side wall above and parallel to the slot, bent fingers on said rod each having an upper part parallel to and grazing the side wall and a lower part which passes through the slot close to the bottom and is parallel to the latter, and a flange carried by the bottom outside the fingers and grazed by the upper portions of the latter, said flange reaching substantially to the level of the upper edge of the slot.

RENÉ BERGERIOUX.